June 18, 1935.　　　F. W. THOMAS　　　2,005,061
AIRPLANE CONTROL
Filed July 27, 1932　　　2 Sheets-Sheet 1
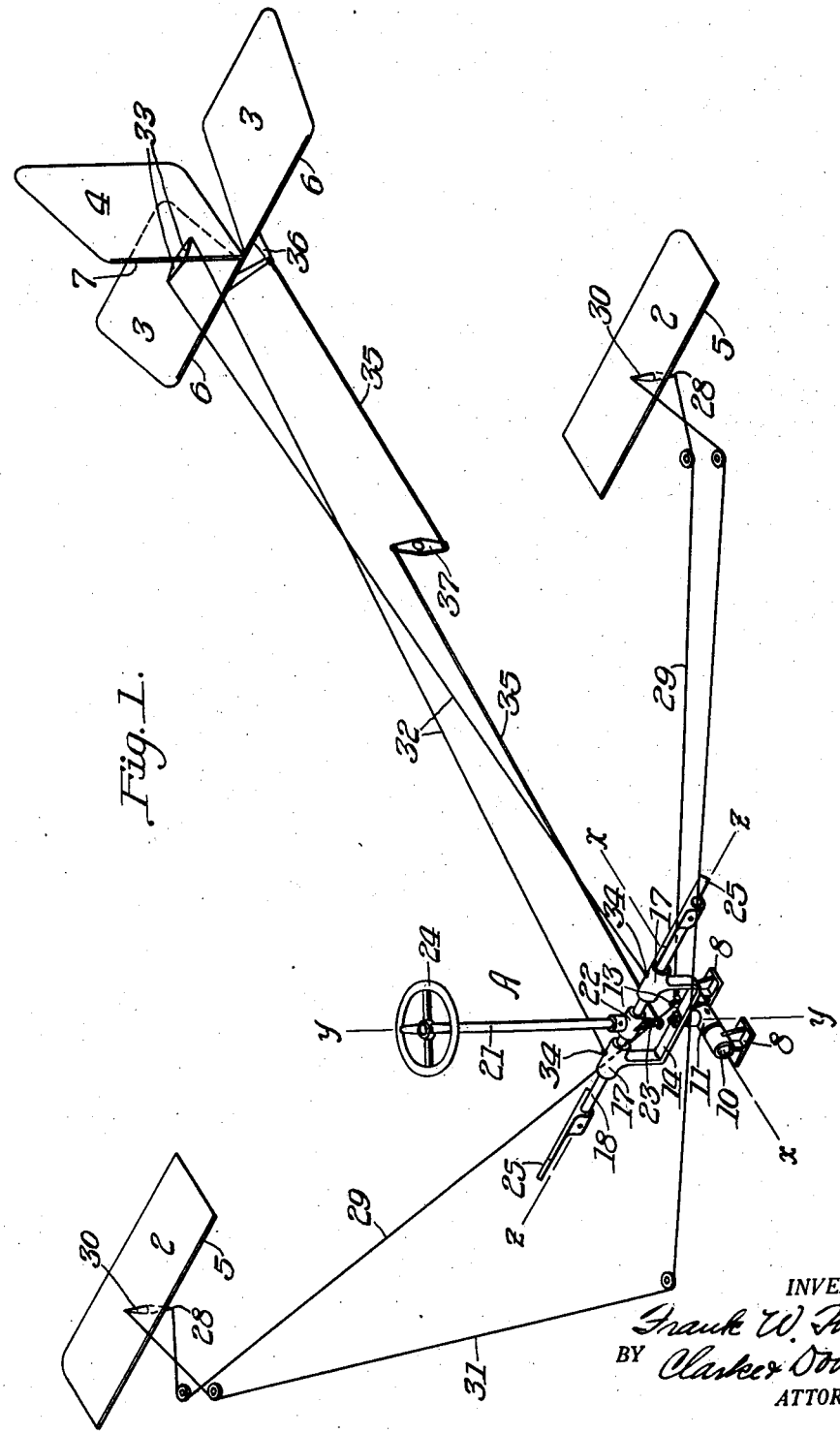

June 18, 1935.  F. W. THOMAS  2,005,061
AIRPLANE CONTROL
Filed July 27, 1932   2 Sheets-Sheet 2
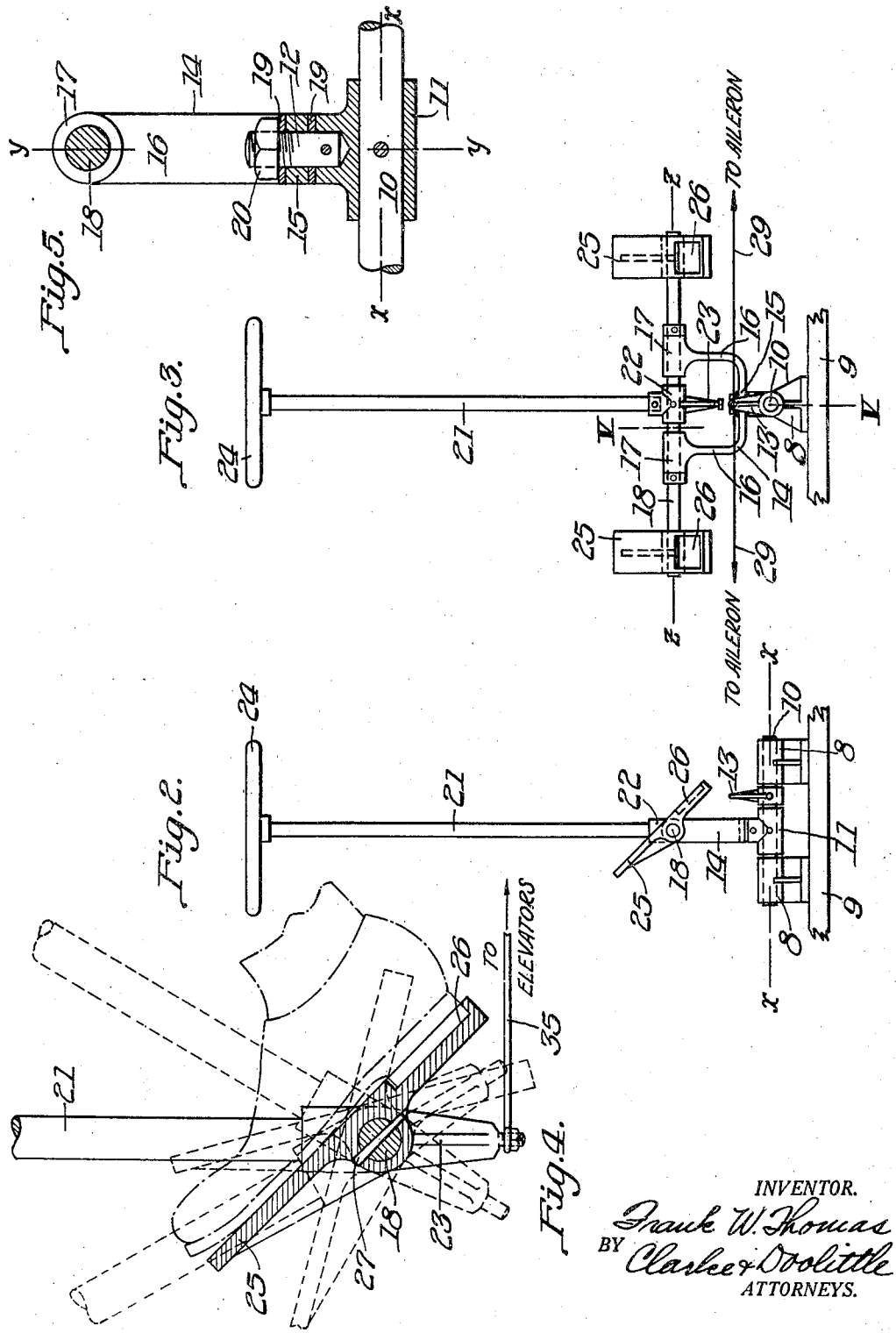
INVENTOR.
Frank W. Thomas
BY Clarke & Doolittle
ATTORNEYS.

Patented June 18, 1935

2,005,061

UNITED STATES PATENT OFFICE 2,005,061

AIRPLANE CONTROL

Frank W. Thomas, Lincoln Place, Pa.

Application July 27, 1932, Serial No. 624,997

2 Claims. (Cl. 244—29)

This invention relates to improvements in airplane controls.

In airplane construction, the controls generally consist of a control lever or stick actuated by the hands of the operator or pilot and a rudder bar actuated by the feet, the said stick and rudder bar being operatively connected with the control surfaces of the airplane. Various modifications have been devised all of which necessitate constant application of the hands and in some cases both hands and feet of the operator, in order to positively maintain the airplane in flying position. Likewise, constant application of the hands of the operator is necessary when taking off or landing the airplane.

It is a prime object of my invention to provide an airplane control mechanism capable of actuation either entirely by the hands or feet of the operator or both as desired, thus giving said operator freedom of the hands or feet during the taking off, flying and/or landing of the airplane without losing positive control thereof.

Additional objects and advantages will become apparent from the following description taken in connection with the accompanying drawings, wherein:

Fig. 1 is a diagrammatic perspective view of an embodiment of my invention operatively connected with the control surfaces of an airplane;

Fig. 2, a side elevational view of the control device;

Fig. 3, a rear elevation thereof;

Fig. 4, an enlarged sectional detail of one of the foot treadles; and

Fig. 5, an enlarged sectional view taken on the line V—V of Fig. 3.

Referring to the drawings and more particularly to Fig. 1, I have shown diagrammatically the movable control surfaces or members commonly employed in airplane construction, including ailerons 2, elevators 3 and a rudder 4. The ailerons 2 are horizontally hinged along their forward edges 5 to a main airfoil or wing, and the elevators 3 are likewise hinged at their forward edges 6 to horizontal stabilizers or fins, as will be readily understood. The rudder 4 is vertically pivoted or hinged for movement about its leading edge 7 rearwardly of a vertical stabilizer fin not shown.

Mounted within the airplane in its proper relationship to the control surfaces just described, I provide my control mechanism, generally designated A. The said mechanism may be secured to the fuselage of the airplane in any suitable manner. For example, bearings 8 may be secured to members 9 of the fuselage to receive a rockable shaft 10 with the axis X—X of said shaft extending longitudinally of the airplane.

Secured to and rockable with the shaft 10 is provided a T-member 11 having a stud 12 therein disposed along an axis Y—Y at right angles to the axis X—X. A lever 13 is also secured to said shaft 10 by means of a suitable hub and is preferably disposed rearwardly of the member 11.

Positioned on the stud 12 and rotatable about the axis Y—Y, I provide a yoke member 14 having a centrally apertured portion 15 for receiving the stud 12 and upwardly extending spaced-apart arms 16 provided with alined bearings 17. Said bearings 17 are designed to receive a transverse shaft 18 rotatable about an axis Z—Z at right angles to the axis Y—Y. Washers 19 may be provided on the stud 12, said stud also having a nut 20 for retaining the yoke 14 thereon.

A control lever or stick 21 is centrally secured to and rotatable with the shaft 18 where said shaft is intersected by the axis Y—Y, as by a T-shaped member 22, said member having a depending control arm 23 in alinement with said control stick 21 and movable within the yoke. A hand wheel 24 is preferably provided at the upper end of the control stick 21 to be grasped by the hands of the operator or pilot.

The shaft 18 extends beyond the bearings 17 to receive a pair of foot treadles 25 of any suitable design. For example, I have shown the treadles 25 provided with heel sockets 26 for receiving the heels of the operator's shoes as in Fig. 4, thus providing means for securely maintaining the operator's feet in position on said treadles. 27 designates pins for securing said treadles on the shaft 18.

Suitable cables, rods or the like are provided for operatively connecting the control mechanism with the movable control surfaces of the airplane to which it is applied. Thus the ailerons 2 may be provided with lower arms or horns 28 for connection with the rotatable arm 13 on the shaft 10 by cables 29, and upper horns 30 connected by a cable 31 passed within the wing structure through suitable guides or pulleys.

Movement of the stick 21 to the right or left to rotate the shaft 10 and arm 13 about the axis X—X will cause the ailerons to move in opposite directions to cause the airplane to bank to the right or left respectively.

Likewise, crossed rudder cables 32 extend from horns 33 on the rudder 4 to be attached to the bearings 17 of yoke 14 as at 34, and rods 35 connect the depending rotatable arm 36 of the elevators 3 with the arm 23 of the stick 21, said rods connecting with the ends of an intermediate double lever 37.

Hence, rotative movement of the control stick 21 forward and backward about the axis Z—Z will cause the elevators 3 to lower and raise respectively, thus controlling the downward and upward travel of the airplane, and rotation of the yoke 14 about its axis Y—Y will move cables 32 to cause the rudder 4 to be deflected for steering the airplane.

In operating an airplane equipped with my control mechanism, the pilot may work the said controls entirely by hand by grasping the wheel 24 and applying the various rotative movements of the mechanism about its X, Y and Z axes, or combinations of such movements.

Likewise, the controls may be operated entirely by the feet of the operator by placing his feet on the treadles 25. Said treadles are preferably disposed at an angle of about forty-five degrees on the ends of the shaft 18 when the controls are in the neutral position so as to afford a comfortable engagement by the feet of the pilot.

The operator or pilot may control the flight of the airplane without the use of his hands by applying the said rotative movements to the mechanism with his feet on the treadles 25. The rudder is actuated to steer the airplane by rotation of the mechanism about the Y—Y axis, the ailerons by rotation about the X—X axis, and the elevators by applying a rotative movement with the feet to the shaft 18 about its Z—Z axis, as in Fig. 4.

In this manner, the pilot may have his hands free for controlling the motor, writing, platting his course and the like. In addition, the device may be applied to fighting or pursuit planes in time of war whereby the pilot may maneuver the airplane into position with his feet on the controls and have his hands free to operate a machine gun in combat.

The control of my invention lends itself to positive and efficient operation of the movable control surfaces of an airplane either entirely by the hands or the feet of the pilot or both, as desired.

Various changes and modifications are contemplated within the scope of the following claims.

What I claim is:

1. An airplane control device including a rockable shaft, a yoke member secured to said shaft and rotatable about an axis at right angles to the axis of said shaft, said yoke member having spaced-apart bearings, a transverse shaft in said bearings, a control stick for said transverse shaft, a control arm in alinement and movable with said stick, and a pair of foot treadles secured to said transverse shaft.

2. An airplane control device including a rockable shaft, a yoke member secured to said shaft and rotatable about an axis at an angle to the axis of said shaft, said yoke member having spaced-apart bearings, a transverse shaft rotatable in the bearings, a control stick fixed to said transverse shaft between said bearings, a control arm depending from the transverse shaft and movable within the yoke with the movement of the stick, and a pair of foot treadles secured to the ends of said transverse shaft.

FRANK W. THOMAS.